(12) United States Patent
Hoelzl et al.

(10) Patent No.: US 6,476,914 B1
(45) Date of Patent: Nov. 5, 2002

(54) PROCESS AND DEVICE FOR ASCERTAINING WHETHER TWO SUCCESSIVE SHAFTS ARE IN ALIGNMENT

(75) Inventors: Roland Hoelzl, München (DE); Heinrich Lysen, Garching (DE); Michael Hermann, Villingen (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/315,157

(22) Filed: May 20, 1999

(30) Foreign Application Priority Data

May 20, 1998 (DE) .......................... 198 22 812

(51) Int. Cl.$^7$ .............................. G01B 11/00
(52) U.S. Cl. .................. 356/400; 356/150; 250/208.2; 250/559.3; 250/559.39
(58) Field of Search ................. 356/400, 399, 356/150, 153, 154, 155, 141.1, 141.2; 250/578.1, 559.37, 559.39, 559.3, 208.2

(56) References Cited

U.S. PATENT DOCUMENTS

| | | | |
|---|---|---|---|
| 4,037,968 A | | 7/1977 | King et al. |
| 4,656,743 A | | 4/1987 | Thiemann et al. |
| 4,698,491 A | * | 10/1987 | Lysen .......................... 250/201 |
| 4,709,485 A | * | 12/1987 | Bowman ........................ 33/228 |
| 4,864,148 A | * | 9/1989 | Lysen et al. ................. 250/561 |
| 4,889,425 A | | 12/1989 | Edwards et al. |
| 5,026,998 A | | 6/1991 | Hölzl |
| 5,077,905 A | * | 1/1992 | Murray, Jr. ................... 33/412 |
| 5,513,000 A | | 4/1996 | Smith et al. |
| 5,771,099 A | | 6/1998 | Ehbets |
| 6,031,606 A | | 2/2000 | Bayer et al. |
| 6,040,903 A | * | 3/2000 | Lysen et al. ................. 356/153 |
| 6,046,799 A | * | 4/2000 | Lysen ....................... 356/139.1 |
| 6,297,467 B1 | * | 10/2001 | Braunecker et al. ......... 250/216 |

FOREIGN PATENT DOCUMENTS

| | | |
|---|---|---|
| DE | 30 20 195 | 12/1984 |
| DE | 38 14 466 | 11/1989 |
| DE | 39 11 307 | 10/1990 |
| WO | WO 98/05924 | 2/1998 |

* cited by examiner

*Primary Examiner*—Robert H. Kim
*Assistant Examiner*—Andrew H. Lee
(74) *Attorney, Agent, or Firm*—Nixon Peabody LLP; David S. Safran (57) ABSTRACT

The effectiveness of a method for checking for exact alignment of two successive shafts, axles or the like is improved by the fact the no measures with respect to linearization or temperature compensation are necessary any longer by using a light-sensitive array as the light-sensitive sensor. The effects of outside light and reflections can be suppressed. The cross section and the quality of a detected laser beam can be checked especially by visual inspection. Production of the corresponding device for executing this process is facilitated. By using matched beam splitters and reflectors as well as light sources of different colors the number of optoelectronic sensors necessary can be significantly reduced.

13 Claims, 5 Drawing Sheets

PROCESS AND DEVICE FOR ASCERTAINING WHETHER TWO SUCCESSIVE SHAFTS ARE IN ALIGNMENT

BACKGROUND OF THE INVENTION

1. Field of the Invention

The invention relates to a process and device for ascertaining whether two successive shafts are in alignment.

2. Description of the Related Art

Processes for exactly aligning two successive shafts to one another were carried out in the past, primarily with purely mechanical measurement means. Typical examples of activities of this type were alignment of electric motors on directly coupled pumps or comparable assemblies. Since it became possible later to replace the mechanical measurement pointers provided for in these processes by light pointers and the pertinent mechanical sensors by electronic ones, a significant facilitation and improvement in the execution of the pertinent measurement tasks were established. Simultaneous use of microprocessors in this connection, and especially for the calibration measurement to then be carried out on the corresponding machines or devices turned out to be extremely helpful.

SUMMARY OF THE INVENTION

Electronic sensors used in the form of special photoelements provided with flat resistance elements, either as selected components, or to provide a linearization process for them. In this way inaccuracies and nonlinearities relating to the location of an incident light beam, and a recordable output signal of the sensor may be kept relatively small. Furthermore, the corresponding nonlinearities were dependent on temperature to a certain extent.

The object of this invention is to largely eliminate these defects of an otherwise extremely useful older invention, especially nonlinearities, and to reduce the temperature dependency which may be present in the optical sensor/sensors to be provided, and at the same time to significantly increase the precision, i.e. the repeatability and resolution of this sensor, to a large degree.

Another object of the invention is to significantly reduce the number of optical and/or optoelectronic components to be used or to design them more economically.

These object are achieved by devising a process which is used to ascertain whether two successive shafts are in alignment with respect to their center axes or are offset against one another at an angle and/or at a distance. By means of several measurement pointers and the pertinent reference elements, a plurality of geometrical measured values can be generated via several measurement angular positions of the shafts which correspond to one another from shaft to shaft, two measurement values being independent of one another, and the measured values having a functional dependency at least on distance and angular offset (especially skewness) of the shafts. As the measurement pointer, at least one light beam in the form of a light bundle of low divergence, especially in the form of laser beam, may be used, and the light beam is oriented such that it is incident on at least one reference element in the form of an optoelectronic array with a plurality of pixels, especially a flat optoelectronic sensor which acts as a CCD (charge coupled device) and in doing so, illuminates and activates part of all the pixels of the array. The positions or coordinate values of the illuminated and activated pixels of the array are electronically determined individually, and with the aid of an electronic computer, at least one characteristic value is determined from the ascertained positions or the coordinate values which describes the location of the incident light spot on the optoelectronic array with respect to one or more coordinates.

For purposes of determining at least one characteristic value in accordance with the invention, preferably one or more, especially arithmetic averages, are computed which indicate the middle position of the light spot with respect to one or more stipulated coordinates.

In a roughly comparable manner, at least one characteristic value can also be determined by determining the focus of the light spot incident on the optoelectronic array. This focus determination relates to linear or flat arrangements of the indicated optoelectronic array. Since the light spot has no mass, it goes without saying that when the indicated focus is formed, light intensities are assumed. The light intensities can obey a continuous distribution here. But they can also be assigned to one of two intensity states, specifically to "on/bright" or alteratively "off/dark".

Furthermore, the process as claimed in the invention advantageously uses a computer and a pertinent program by which in addition to computing one or more averages the pertinent quantities, "scattering" or "variance" are determined. The shape of the light spot can be checked by this measure. This is based on the fact that an irregularly shaped light spot will produce other values for the indicated quantities as a light beam which is incident is regularly shaped on the optoelectronic array. In a comparable manner, if feasible, higher statistical moments can be used for evaluation and assessment of the quality of an incident light beam.

Since an incident light beam typically does not have a constant intensity over its cross section, but generally has an intensity peak in the vicinity of its axis, it is advantageous to define an edging cross sectional outline for this light beam such that before acquiring the signal, a threshold intensity is set so that activated pixels of an optoelectronic array in which the incident light beam has a local intensity greater than the aforementioned threshold intensity are considered. Therefore, this is especially advantageous because the corresponding component object can be achieved by using simple hardware in the form of a comparator. The same object can also be achieved by a suitable computer software combination, but the aforementioned approach is much more efficient and thus, economical. The required capacity of a computer which must be provided anyway, can be kept low by further processing only those pixels which can be assigned to one edge or transition between one intensity range with a first intensity value and another intensity range with a second intensity value.

To check the intensity and/or the cross sectional shape of the incident light beam, it is a good idea to check the number of activated pixels above or below stipulated boundary values. In this way, it becomes apparent whether an incident light beam is either too small or, for example, is on the edge areas of an illuminated optoelectronic array.

If enough computer time is available, it is also advantageous to supply a light spot (or its edges, as was mentioned above) to be recorded on an optoelectronic array for more extensive pattern recognition. Only when its shape recorded at the time corresponds to a stipulated criterion does optionally further evaluation take place, i.e. the determined characteristics are further used in a following computation step of a program assigned to the process in accordance with the present invention.

In another embodiment of the process in accordance with the present invention the process includes consists in another evaluation phase of recognition and computational elimination of the light portions which can be attributed to undesirable optical reflections. For this reason, in the conventional manner, methods of integral transformation, deconvolution operations and similar computer methods, especially based on the so-call Fast Fourier Transform, can be used.

In another embodiment of the invention, the process is the reverse, i.e. optical reflections are caused in a controlled manner and are used for evaluation by measurement. In this connection, it is advantageous for the provided sensor to be able to discriminate individual illuminated areas from one another and to parameterize them, i.e. to deliver the parameters for a plurality of individual objects relevant to measurement engineering. It should be remembered that to date, all devices used in this connection have been able to determine essentially only two parameters for incident light, specifically the focus of the incident light in one x-axis and in a y-axis orthogonal thereto.

Especially prompt availability of these characteristics is enabled by using the aforementioned discrimination of cases "on/bright" and "off/dark" for the light intensity at the site of an individual pixel of an optoelectronic array; is also possible for more accurate analyses, if they are desired or necessary, of the locally present illumination intensity of the incident light beam to be determined for an activated pixel and to be made available as a digitized quantity for further computation processes. This approach, specifically the interconnection, for example of a CCD sensor and an analog-digital converter (ADC), is known.

Regardless of whether the latter approach is used or not, in accordance with the present invention, the location and/or the cross section (or the intensity properties over the cross section) of at least one, but preferably several light beams recorded by the optoelectronic array can be completely displayed in an extremely simple manner on a downstream display. By means of this immediate visual control possibility, a user of the process in accordance with the present invention can be immediately informed whether the number and arrangement of incident light beams of correct size, shape and location appear.

To make the process in accordance with the present invention feasible, there is a corresponding device which can have a so-called CCD sensor as an especially economical basic component. In one qualitatively improved embodiment, a so-called CMOS image sensor is used. To further improve the optoelectronic signal acquisition, it can also be feasible to make available an auxiliary device which comprises a modulation or multiplexing device using conventional art, with which the light beam can be varied in its intensity or in its beam direction, especially can be turned on and off in pulses. In particular, LCD-based modulation means are advantageous for this purpose. They can also be used to provide the light beam with a variable cross section. In this way, it is possible to even better assess the quality of the light beam incident on the optoelectronic array or to deliver it to especially high quality pattern recognition in order to achieve especially accurate determination of the aforementioned characteristics.

The invention is explained below using the drawings.

DETAILED DESCRIPTION OF THE INVENTION

Figure 1:
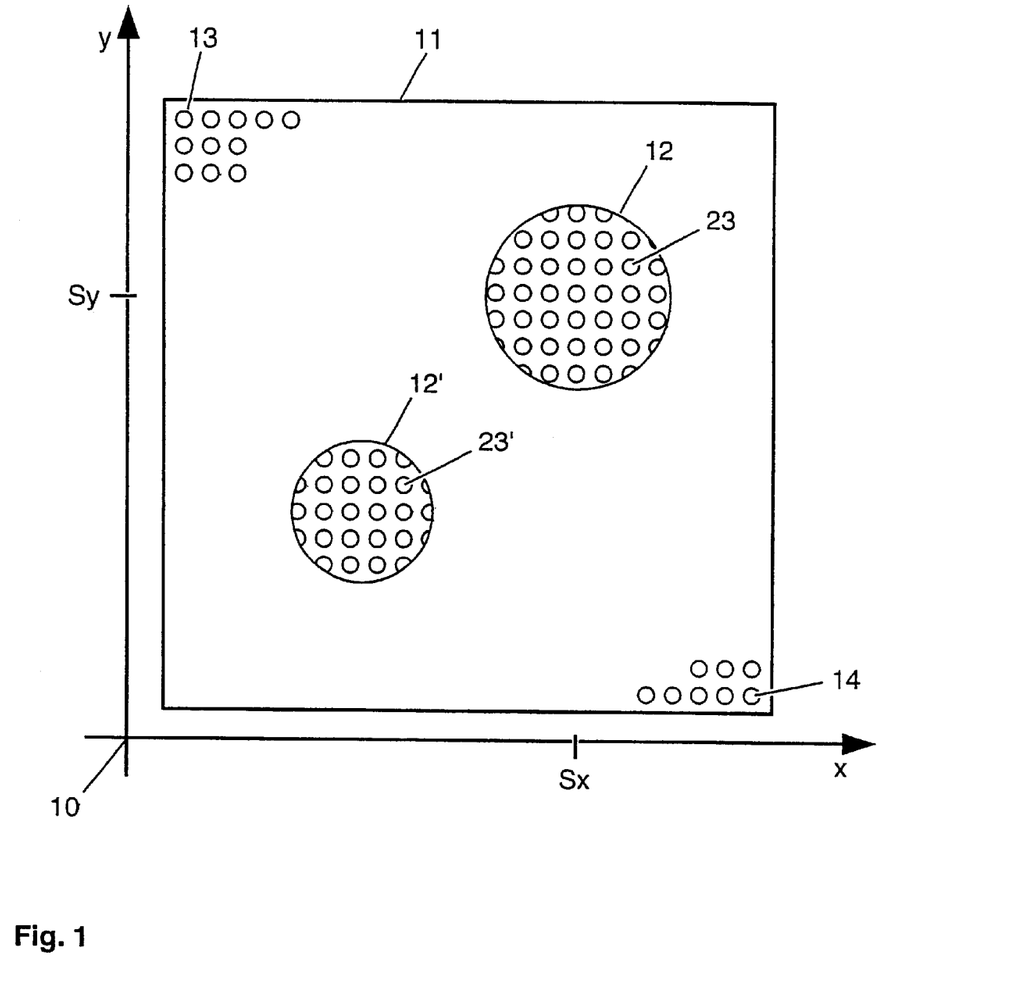
FIG. 1 shows the geometrical location and distribution of light intensities of at least one light spot

FIG. 1 shows how one or more light spots 12, 12' which activate individual pixels 23, 23' of the array are generated by a light beam on an optoelectronic array 11. In subsequent readout of the array 11 the positions of the illuminated pixels 23, 23' (and thus also the nonilluminated pixels (13, 14) are determined. These positions can be determined relative to a Cartesian coordinate system which is provided permanently on the array 11 with x-axis and y-axis which intersect at the origin 10. The technique of read-out of linear or flat optoelectronic arrays is examined hereinbelow. Determination of the characteristics Sx and Sy by which the location of the first light spot 12 is specified very accurately takes place by determining either (optical) focal coordinates for the focus S or other averages in the x-direction according to the aforementioned description by summation of the x-coordinates of the illuminated individual pixels 23. The reference symbol Sx designates one such characteristic for the x-coordinate.

In the same way and independent of the determination of the corresponding characteristic which was done for the x-coordinate, analogous one such characteristic is computed for the y-coordinate. The reference symbol Sy designates one such characteristic for the y-coordinate. Determination of other statistical quantities which can be assigned to the illuminated pixels preferably corresponds to conventional computer methods and need not be detailed here.

In a comparable way, the coordinates of the focus for the light spot 12' which can be characterized, for example, by lower light intensity, are determined.

Let it be established that before determining the indicated focus coordinates, automatic assignment of edges of one or more light spots takes place so that the focus determination can be assigned explicitly to the individual (and usually, variously bright or variously shaped) illuminated areas of the array or sensor which is used. The corresponding computational methods are known.

Although the indicated computations of averages or focus are also known, their application to the present invention yields a special advantage for the proposed process as described in per the following analysis.

In a light spot with a diameter of roughly 1 mm, 10000 pixels can be illuminated and are then, included in the computation of the average or focus. Since the distances of the pixels 23 are only a few microns using current technology, after completion of averaging, characteristics are formed which purely arithmetically have a resolution in the nanometer range. This resolution when compared to previous approaches, is several orders of magnitude finer, therefore, more favorable. At the same time, as a result of the process of production of the optoelectronic arrays, almost no linearization of the output signal is necessary any more. In addition, the determined characteristics Sx and Sy are only slightly dependent on temperature. Thus, the invention enables acquisition of measured values which leads to significantly more accurate end results in the application of the process given, for example, in the German reference DE3911307.

In addition, the acquisition of individual, different illuminated areas (light spots) on one embodiment of the sensor is shown in FIGS. 2 to 5.

Figure 2:
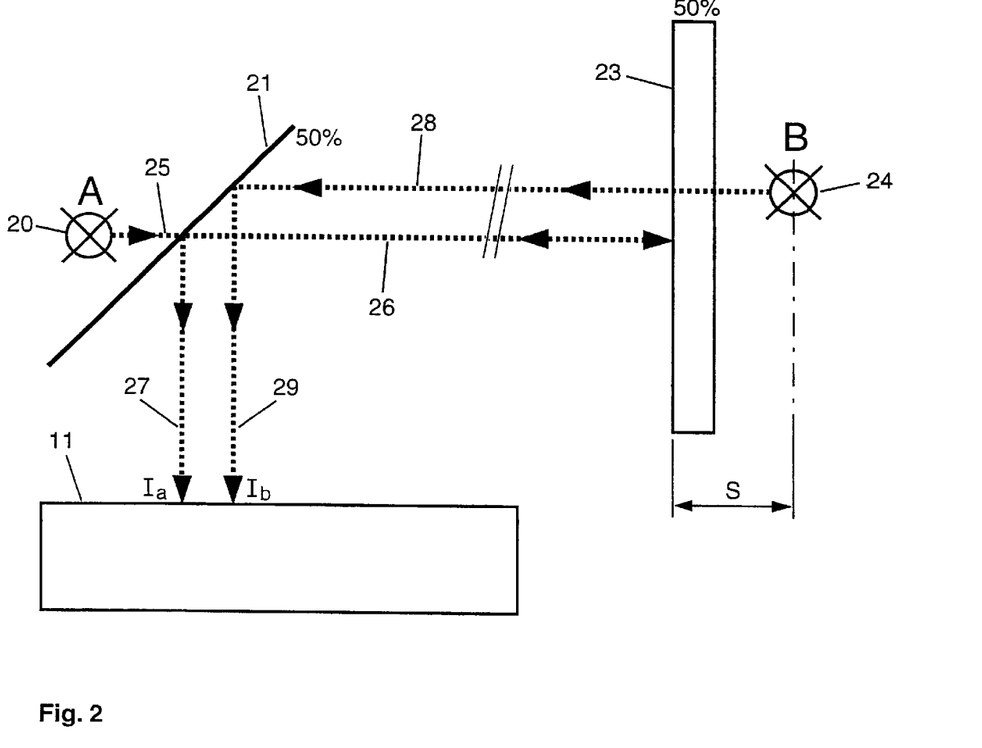
FIG. 2 shows the beam path relating to generation and detection of two light spots.

FIG. 2 shows how an optoelectronic array 11 is illuminated at the same time by two light sources so that the illuminated areas Ia and Ib can be supplied separately from one another to be evaluated using measurement engineering. It is especially advantageous, for the light emitting devices A and B (more briefly called light sources, reference numbers 20 and 24) to emit light of different colors, i.e. wavelengths (or wave mixtures). In this case the, sensor (array 11) is sensitive to several colors, such as those used in so-called digital cameras. The array 11 is spaced a fixed distance relative to the light source 20 and to a partially transparent reflector 21. At a variable distance and with a variable orientation to the light source A, there is a combination consisting of the light source B (reference number 24) and a partially transparent reflector 23, the basic arrangement of the light source and sensors for the alignment instruments provided here being known and not further explained to avoid length. Advantageously, therefore the light source 24 is at a fixed distance to the partially transparent reflector 23, with a distance "s" as large as possible. The reflector 23 can be not only partially transparent, but can also have additional color filter action so that for example, it reflects strongly for green light and has an acceptable degree of transmission for red light. In this case, it is provided that the light source (A) (for example a semiconductor or a focussing light emitting diode) shows, for example green, while conversely, the light source B shows red or infrared, for example. A light beam 25 emerging from the light source 20 is therefore, attenuated first by the partially transparent reflector 21 and is incident on the front reflecting plane of the reflector 23. It returns attenuated as a reflected light beam 26, is again reflected on the reflector 21, but in the opposite direction, and is attenuated, and as light beam 27 generates the illuminated areas Ia on the array 11. This area, as a result of its green color, can be explicitly identified (if it cannot be recognized based on its location) as belonging to the light source 20. Depending on the position and orientation of the light source 24 and the reflector 23, the location of the impact of the light beam 27 on the array 27 varies. This makes available, a first measured quantity with which both the relative orientation of the combination 23, 24 with respect to 11, 20, 21 can be computed. Also information for calibration of pertinent objects or machines on which these combinations are temporarily attached for purposes of alignment can be computed. At the same time the light, source 24 with, for example red light, generates a directional and likewise attenuated light beam 28 which after reflection on the partially transparent reflector 21, is incident on the array 11 as the light beam 29 in attenuated form in the illuminated area Ib. This area can also be explicitly identified based on its different color. Thus, a second measured quantity is available to be able to perform the aforementioned measurement task.

Further processing of the indicated first and second measured quantities proceeds preferably using known methods. They are based, for the most part, on determining measurement quantities which vary sinusoidally over a mechanical angle of rotation, according to amplitude and phase and also optionally, the direction of rotation. The especially accurate determination of these quantities uses various methods of compensation calculation.

Figure 3:
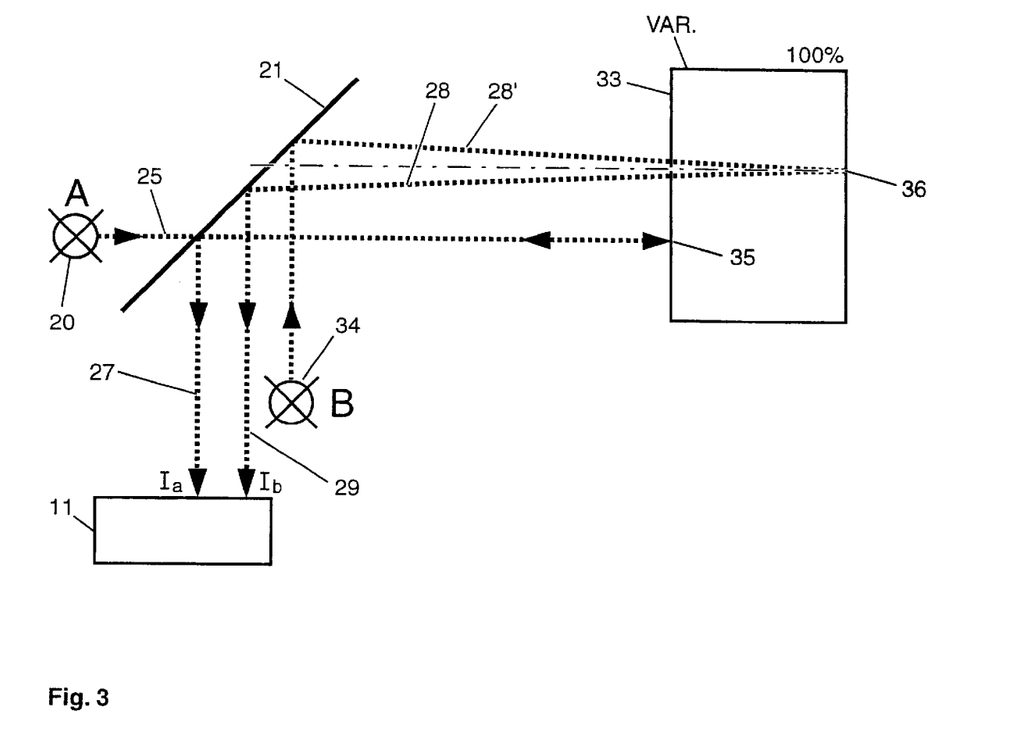
FIG. 3 shows another beam path relating to generation and detection of two light spots

Similar assumptions apply to the arrangement shown in FIG. 3 so that its description can be kept brief, especially with reference to the aforementioned application document.

Similar to FIG. 2, the embodiment of FIG. 3 includes there are two preferably different light sources 20, 34, at this point the light sources 20, 34 and the partially transparent reflector 21 and the pixel array 11 being spaced a fixed distance among one another. Both light sources 30, 34 cause, similarly to as is shown in FIG. 2, two illuminated areas Ia and Ib which have different colors and/or different locations. This arrangement has the advantage that all active components are arranged in a concentrated manner and a measurement instrument component which can be varied in location and orientation can consist of only one special reflector 33. The reflector 33 preferably has a roughly 100% reflecting back surface 36 which is spaced relatively far from the front side 35 (roughly 5 to 50 mm). In addition, there is partially transparent mirroring on its front side 35 which can also have a color filter action. When the orientation of the reflector 33 varies with respect to the reflector 21, with consideration of the beams 27, 28, 28' and 29, different positions of the illuminated areas Ia and Ib arise which can likewise, be evaluated by measurement engineering. This approach, as well as the approach shown in FIG. 2, when compared to the prior art, saves a second two-dimensionally acting optoelectronic detector element which is otherwise necessary.

Figure 4:
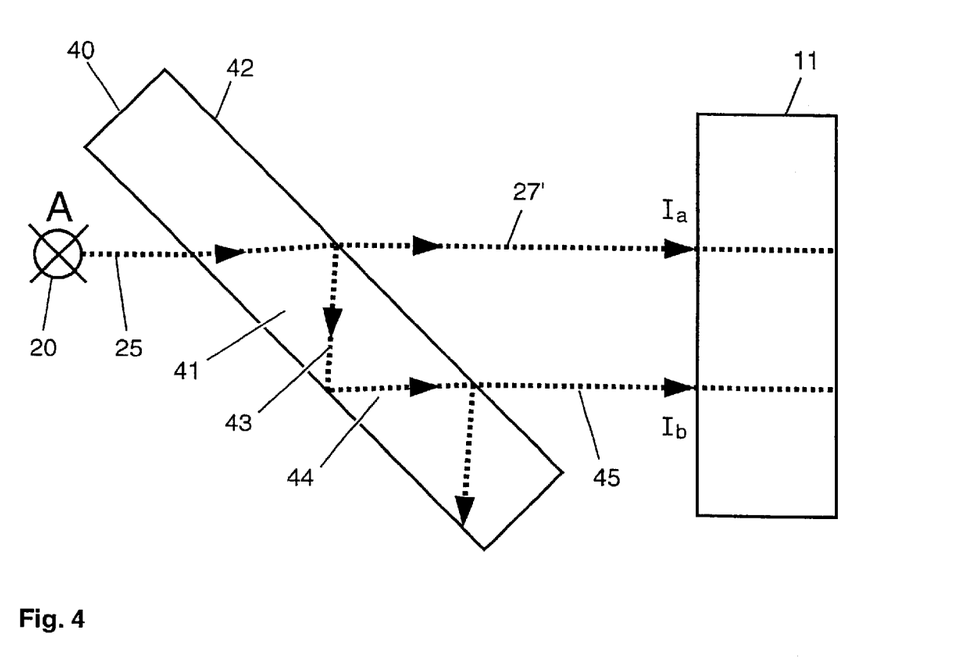
FIG. 4 shows another beam path for generating two light spots, but with only one real light source

FIG. 4 shows another approach where there is only a single light-emitting device 20 for sending a light beam of narrow diameter 25. The light source 20 and the combination of a detection array 11 and a plane-parallel transparent plate 40 which is mirrored on both sides and partially transparent, are spaced at variable distances and can be oriented to one another according to the measurement task to be performed. The detection array 11 and the plate 40 are spaced (and thus oriented) at a fixed distance and with high precision to one another. The plate is relatively thick and is made of "Zerodur" to achieve a high thermal stability. The distance of the front plane 41 from the back plane 42 of the plate is roughly 5 to 50 mm. When the angle of incidence of the light beam 25 on the plate 40 varies slightly, measurably different distance changes of the illuminated areas Ia and Ib arise on the array 11 since it can provide an extraordinarily high local resolution by means of methods of statistics and feature extraction.

As shown in FIG. 4, the light beam 25 which is incident on a front plane 41 at a relative angle of roughly, for example, 45° to the surface normal is partially reflected and there, partially refracted into the optically denser medium of the plate, to then be incident on the array 11 after partially passing through the back plane 42 as beam 27 with parallel offset.

The remainder of the light beam which has been transmitted on the plane 42 is fractionally reflected and as the beam 43, it is incident on the front plane 41, as shown. Partial reflection takes place again so that a beam 44 which is already clearly attenuated after further attenuation, is incident on the array 11 through the back plane 42 as the beam 45, which depending on the thickness of the plate 42 is positioned at a relatively great distance to the area Ia. This distance changes slightly, but can be measured very accurately when the angle of incidence of the beam 25 varies. The positions of the areas Ia and Ib conversely, change directly with the variation of the incidence site of the beam 25 on the plate 40, instead of a plate 40 there can be identical mirror surfaces spaced in parallel which do the same thing, with temperature-independent and position-independent parallel alignment. However, such arrangement is either less accurate or which can be made available only with greater cost. Furthermore, the array 11 and the plate 40 for improving the required stability can be located at a more acute angle or parallel to one another.

Figure 5:
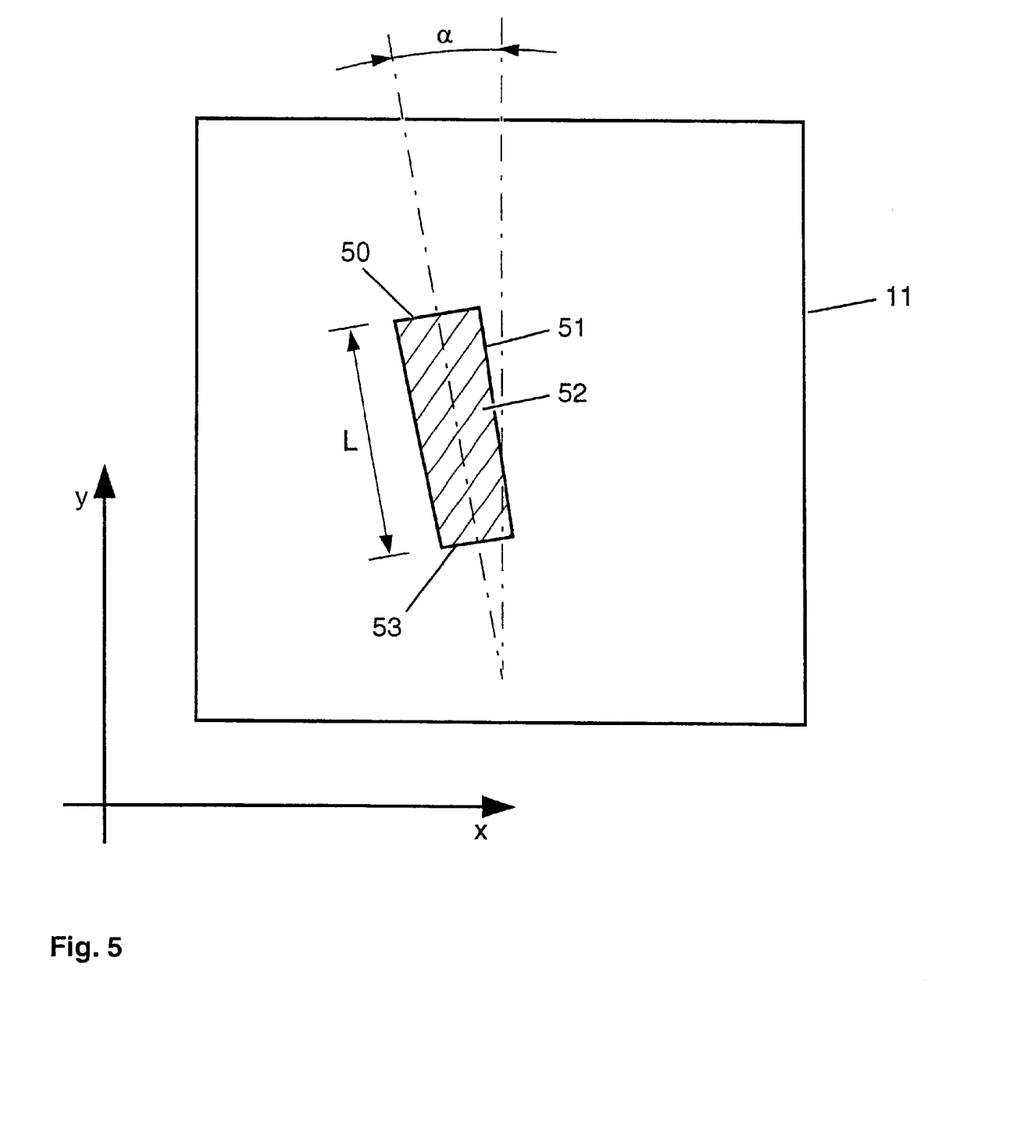
FIG. 5 shows the positioning of one light spot of elongated or asymmetrical shape.

In another embodiment of the invention, it is shown in FIG. 5 how with the aid of pixel-oriented light sensors, other measurement engineering possibilities which had not previously been used can be made available. If in conjunction with the underlying measurement object, a stipulated light beam is shaped or a light source imaged such that an elongated or asymmetrical light spot 50 arises on the array 11, in addition to the location of the focus 52 relative to an x-y coordinate system, the angular orientation of the light spot 50 to the array 11 can also be determined. Thus, an angle of rotation alpha ("roll angle") of the emitting light source can be indicated relative to the x-axis of the array 11. This will be used, for example, for determining the coupling errors in coupled shafts, axles and the like. The mathematical methods for determining the main direction of the light spot 50 with respect to its focus 52 and relative to the x-axis of the array 11 can thus be regarded as known.

In addition, using the side ratios of, for example, the short side 53 and the long side 51 of the light spot, a conclusion can be drawn about the imaging quality so that when the imaging ratios are insufficient, taking of the measurement can be automatically refused or at least criticized. If the side ratio is recognized as acceptable, based on the length of the side 51 under certain circumstances, a conclusion can be drawn regarding how far the array is located from the emitting light source. This process is more accurate than if only the diameter of a circular light spot is measured. In addition, measures must be taken for at least changing portions of the light spot in the manner of a projection process depending on distance. It is therefore recommended that for this special additional method of measuring the rotary position and distance, either projective imaging of light emitting diodes or laser diodes be done or an existing laser beam with the corresponding beam shaping be modified.

What is claimed is:

1. A method for ascertaining alignment of two successive shafts comprising the steps of:
   providing at least one measurement pointer for generating a light beam having low divergence;
   providing at least one reference element including an optoelectronic array with a plurality of pixels;
   orienting said light beam from said measurement pointer such that said light beam is incident on said at least one reference element to illuminate and activate at least some of said plurality pixels of said optoelectronic array;
   determining coordinate values of illuminated and activated pixels of said optoelectronic array to determine the position of said illuminated and activated pixels which correspond to a light spot on said optoelectronic array;
   measuring the quantity of at least one of light scattering and variance to determine a shape of the light spot incident on said optoelectronic array; and
   generating a plurality of geometrical measured values corresponding to an alignment characteristic including at least one of distance and angular offset between said two shafts based on said coordinate values of the illuminated and activated pixels forming the light spot,
   wherein said alignment characteristic is determined based on a computed arithmetic average which indicates a middle position of said light spot.

2. Method of claim 1, wherein said alignment characteristic is determined by an electronic computer.

3. Method of claim 2, wherein said measurement pointer is a laser and said optoelectronic array is a flat charge coupled device (CCD).

4. Method of claim 1, wherein an alignment characteristic is further determined by calculating an intensity of light incident on said optoelectronic array.

5. Method of claim 1, further comprising the step of providing a threshold intensity which must be exceeded by an intensity of said incident light beam in order to activate each of said plurality of pixels of said optoelectronic array.

6. Method of claim 5, wherein at least one of intensity and a shape of said incident light beam is determined by monitoring at least one of the number of activated pixels and the number of nonactivated pixels.

7. Method of claim 1, further comprising the step of comparing said shape of said light spot on said optoelectronic array to a stipulated shape criterion and storing said shape of said light spot into a memory device for an additional processing step.

8. Method of claim 7, wherein said additional processing step comprises the steps of determining light portions which can be attributed to optical reflections and computationally eliminating said light portions which can be attributed to optical reflections.

9. Method of claim 1, further comprising the step of determining an illumination intensity of said incident light beam on an activated pixel and providing a digitized signal corresponding to said illumination intensity.

10. Method of claim 1, further comprising the step of displaying at least one of a location and a shape of a light spot incident on said optoelectronic array on a display screen.

11. Device for ascertaining alignment of two successive shafts comprising:
    a first and a second light source for generating light beams of narrow cross section;
    a first and a second optical element, each of said first and second optical elements being partially transparent and partially reflective;
    an optoelectronic array for detecting said light beams;
    wherein said first light source, said first optical element and said optoelectronic array are oriented and spaced in a fixed position relative to one another, said first optical element being substantially flat and aligned in a manner that said light beams are at least one of incident and reflected at an angle of incidence of substantially 45° relative to a surface normal; and
    wherein said second light source and said second optical element are oriented in a fixed position relative to one another and are spaced by a predetermined distance in a manner that said light beams generate separable illumination areas which are distinguishable from one another on said optoelectronic array.

12. Device of claim 11, wherein said first light source generates a light beam having a different spectral composition than a light beam generated by said second light source.

13. Device for ascertaining alignment of two successive shafts comprising:
    a light source for generating a primary light beam of narrow cross section;

a pixel-based optoelectronic sensor; and an optical plate which is partially transparent and partially reflective having a first surface and a second surface which are substantially parallel to each other, said optical plate being oriented and spaced in a fixed position relative to said optoelectronic sensor and being adapted to divide said primary light beam which is incident at an angle to said optical plate into at least one first and one second secondary light beam, each of which illuminates a first and a second area of said optoelectronic sensor respectively;

wherein a distance between said first and said second area of said optoelectronic sensor illuminated by said at least one first and one second secondary light beam is determined by said angle of incidence of said primary light beam on said first surface.

* * * * *